US012774805B2

(12) United States Patent
Rasmussen

(10) Patent No.: US 12,774,805 B2
(45) Date of Patent: Oct. 27, 2026

(54) ENCLOSURE SEALING FOR ELECTRONIC EQUIPMENT

(71) Applicant: Harman Professional Denmark ApS, Aarhus (DK)

(72) Inventor: Niels Jørgen Rasmussen, Egaa (DK)

(73) Assignee: Harman Professional Denmark ApS, Aarhus N (DK)

( * ) Notice: Subject to any disclaimer, the term of this patent is extended or adjusted under 35 U.S.C. 154(b) by 29 days.

(21) Appl. No.: 18/796,999

(22) Filed: Aug. 7, 2024

(65) Prior Publication Data

US 2025/0060092 A1 Feb. 20, 2025

(30) Foreign Application Priority Data

Aug. 14, 2023 (EP) .................................... 23191302

(51) Int. Cl.
*F21V 31/00* (2006.01)
*F16J 15/10* (2006.01)

(52) U.S. Cl.
CPC ........... *F21V 31/005* (2013.01); *F16J 15/104* (2013.01)

(58) Field of Classification Search
CPC ........ F21V 31/005; H05K 5/061; H05K 5/06; H05K 5/0217; F16J 15/104
See application file for complete search history.

(56) References Cited

U.S. PATENT DOCUMENTS

| | | | | |
|---|---|---|---|---|
| 3,171,886 A * | 3/1965 | Holt | B60R 1/02 | 52/204.597 |
| 3,612,852 A * | 10/1971 | Bogossian | F21V 31/005 | 277/606 |
| 5,169,161 A * | 12/1992 | Jones | F16J 15/025 | 277/615 |
| 5,970,659 A * | 10/1999 | Oord | B60J 10/75 | 49/377 |
| 6,206,546 B1 * | 3/2001 | Krogman | F21V 17/12 | 362/267 |
| 8,136,279 B1 * | 3/2012 | Nearman | F16J 15/061 | 277/644 |
| 8,492,651 B2 * | 7/2013 | Schindler | H05K 5/061 | 439/535 |
| 10,865,881 B2 * | 12/2020 | Yui | F16J 15/102 | |
| 10,995,918 B1 * | 5/2021 | Hwang | F21S 9/037 | |
| 2016/0057878 A1 * | 2/2016 | Su | G06F 1/1656 | 361/752 |
| 2019/0120458 A1 * | 4/2019 | Schneider | F21V 3/061 | |
| 2019/0309850 A1 * | 10/2019 | Yoshida | F16J 15/10 | |
| 2021/0367296 A1 * | 11/2021 | Ono | F16J 15/106 | |

FOREIGN PATENT DOCUMENTS

| | | |
|---|---|---|
| FR | 2831384 | 4/2003 |
| IT | MI20111765 A | 3/2013 |
| JP | 2013207114 A1 | 10/2013 |

* cited by examiner

*Primary Examiner* — Jong-Suk (James) Lee
*Assistant Examiner* — James M Endo
(74) *Attorney, Agent, or Firm* — Angela M. Brunetti

(57) ABSTRACT

A sealing system for electronic equipment that forms a liquid-tight seal between first and second enclosure components, which is independent of a fastening force applied to the second enclosure component in a direction towards the first enclosure component.

17 Claims, 11 Drawing Sheets

ENCLOSURE SEALING FOR ELECTRONIC EQUIPMENT

CROSS REFERENCE

Priority is claimed to application serial no. 23191302.1, filed Aug. 14, 2023 in Europe, the disclosure of which is incorporated in its entirety by reference.

TECHNICAL FIELD

Various examples of the disclosure generally relate to the field of enclosures for electronic equipment. Various examples of the disclosure specifically relate to a sealing concept to create sealed inner spaces for housing electronic equipment, in particular for light fixtures.

BACKGROUND

Electronic equipment, for example outdoor light fixtures or audio equipment, require protection against the ingress of external elements, such as water, to ensure their proper functioning and longevity. This is often achieved by employing sealing mechanisms between the various components of the enclosures of such equipment.

Conventional sealing methods often use gaskets compressed between two parts using screws or spring-loaded clamps to create a compression force on the gasket. This is to ensure a liquid-tight seal between the components of the enclosure. However, such methods have inherent limitations. For one, the parts to be sealed need to be very rigid to ensure an even compression force. This often necessitates the use of thick or metal materials, resulting in increased weight and cost.

Alternatively, a high number of screws may be used along the perimeter to achieve the necessary compression force. However, this approach can be very time-consuming during service or maintenance of the equipment, and the quality of the sealing often depends on the torque applied on the screws and how rigid the material is, making the process inconsistent and reliant on the skills of the operator.

Moreover, the more complex the geometry of the enclosure, the more challenging it is to ensure a secure and effective seal, especially for movable parts like a moving head in a lighting fixture.

SUMMARY

Accordingly, there is a need for advanced techniques for sealing electronic equipment enclosures, which alleviate or mitigate at least some of the above-identified restrictions and drawbacks.

This need is met by the features of the independent claims. The features of the dependent claims define further advantageous examples.

In the following, the solution according to the present disclosure will be described with regard to the claimed sealing systems as well as with regard to the claimed sealing methods, wherein features, advantages, or alternative embodiments can be assigned to the other claimed objects and vice versa. In other words, the claims related to the systems can be improved with features described in the context of the methods, and the methods can be improved with features described in the context of the systems. Further, it will be understood by a skilled person that the various features described in the context of the systems and methods, wherein the sealing gasket is fixed with the gasket body on a first housing or enclosure component, for example a frame part, and with the sealing protrusion facing towards the second enclosure component, for example a second frame part or a cover part, can be applied as well in the context of the systems and methods, wherein the sealing gasket is fixed with the gasket body on the second housing or enclosure component and the sealing protrusion facing towards the first enclosure component. The skilled person will understand that—mutatis mutandis—in such examples, some of the features will need adaptions in order to accommodate for the switched arrangement and orientation of the gasket.

A system for creating a sealed enclosure for electronic equipment is provided. This system comprises a first enclosure component, which has an opening defining an outer peripheral surface that faces outwards relative to an axis through the opening, which may also be referred to, with respect to the inner and outer peripheral surfaces, as longitudinal axis.

For example, electronic equipment may comprise light fixtures, loudspeakers, amplifiers, or in general high-power electronic device or circuits, for example including at least one processor and memory for performing computer-implemented processes.

An opening may refer to an aperture or cavity in the first enclosure component that allows access to an internal space of the enclosure. This internal space is where the electronic equipment is intended to be housed, and needs to be protected from external elements, such as dust, water, and the like.

The opening may be defined by a wall having an outer peripheral surface. This surface represents the boundary or edge of the opening and can be described as the portion of the first enclosure component that delineates the spatial limits of the opening. This surface could be at least partially flat, curved, with convex and/or concave regions, depending on the design requirements of the enclosure. It might be round, oval, rectangular, or any other free-form shape suitable for the particular application or type of equipment to be housed.

The longitudinal axis represents a hypothetical line that extends through the center of the opening defined by the first enclosure component. The axis may extend from one side to the other side of the opening and is perpendicular to the area of the opening. The axis may serve as a reference line for the relative positioning and orientation of the system's components, including the first and second enclosure components and the gasket. The orientation of these components in relation to this axis, their displacement along it, and their angular orientation relative to it are central to the system's operation. In this regard inner or inward-facing refers to a direction towards the axis, and outer outward-facing refers to a direction away from the axis. An axial direction refers to a direction along the axis. The axis may be referred to as longitudinal with reference to the inner and outer peripheral surfaces, which are closed surfaces extending in a ring-shape around the axis.

The system further comprises a flexible ring-shaped gasket, wherein the gasket comprises a gasket body in contact with the outer peripheral surface and a sealing protrusion extending outward, i.e., in a direction away from the longitudinal axis, in particular radially outward, from the gasket body along its perimeter.

The system further comprises a second enclosure component defines a ring-shaped inner peripheral surface, which is arranged around the outer peripheral surface and faces inwards towards the outer peripheral surface.

The outer and inner peripheral surfaces extend in an axial direction, or in other words along the longitudinal axis. The inner peripheral surface of the second enclosure component is in contact with the sealing protrusion along its perimeter, forming a liquid-tight seal between the first and the second enclosure components.

The longitudinal axis further serves as a reference for the arrangement of the outer and inner peripheral surfaces. The outer peripheral surface is defined by the opening of the first enclosure component. It is oriented such that it faces outwards relative to the longitudinal axis. This surface is in contact with the gasket body and extends along the longitudinal axis, which means that its orientation and arrangement are aligned with a direction along this axis.

Similarly, the inner peripheral surface, which may also be referred to as inward-facing or inner sealing surface is a part of the second enclosure component. It's arranged outside around the outer peripheral surface and oriented to face inward towards the outer peripheral surface. As the outer peripheral surface, the inner peripheral surface also extends along the longitudinal axis.

The outer peripheral surface may also be referred to as the outward-facing boundary of the opening in the first enclosure component. It may also be referred to as outward-facing or outer sealing surface. It may extend around the periphery of the opening and face away from the longitudinal axis passing through the opening. This outer peripheral surface is the area where the gasket body makes contact, and it is also the surface along which the second enclosure component's inner peripheral surface slides or moves.

The outer sealing surface may be the part of the outer peripheral surface that is in direct contact with a sealing gasket, especially the gasket body. A sealing interaction between the outer sealing surface and the gasket is crucial for achieving the liquid-tight seal. This may be provided by elasticity of the gasket when provided around the perimeter of the outer peripheral surface, or in case of concave regions of the outer peripheral surface, by an adhesive or glue, or a press fit in a peripheral groove, to ensure liquid-tight contact between the gasket and the outer peripheral surface, whereto the gasket is fixed.

The physical structure of the first enclosure component forms the boundaries of the opening. The opening and outer peripheral surface may be defined by a wall, and may comprise a continuous, unbroken surface, or it could comprise multiple interconnected surfaces. The wall might also incorporate features like grooves or channels, which can serve to house the gasket or facilitate the movement of the second enclosure component, as will be described in detail.

An inside space of the first enclosure component may be closed by the second enclosure component, referring to a volume or area within the first enclosure component that is accessed through the opening. This may be space that is intended to house the electronic equipment, and which needs to be protected from the external environment. This inside space can vary greatly in size and shape, depending on the type and configuration of the electronic equipment that it is intended to accommodate. It may also be compartmentalized or subdivided into separate regions for housing different components or sub-assemblies of the electronic equipment.

In various examples, the system is used for creating a sealed enclosure to protect electronic equipment from ingress of external elements, like dust, water, etc. The first enclosure component of the system is provided with an opening that defines an outer peripheral surface. This outer peripheral surface faces outwardly relative to a longitudinal axis, which passes through the opening. The sealing mechanism in this system is a flexible ring-shaped gasket, which comprises a gasket body and a sealing protrusion. The gasket body is in direct contact with the outer peripheral surface of the first enclosure component. Radially extending from the gasket body along its perimeter is the sealing protrusion. The second enclosure component defines an inner peripheral surface, arranged to enclose the outer peripheral surface of the first enclosure component and facing inwards towards this outer peripheral surface. The inner and outer peripheral surfaces may extend along the longitudinal axis in a coaxial arrangement. The second enclosure component's inner peripheral surface comes into contact with the sealing protrusion along its perimeter, thus forming a liquid-tight seal between the first and second enclosure components.

Thereby, a sealing system for electronic equipment enclosures is created that effectively prevents the ingress of external elements like water, dust, etc. The ring-shaped gasket's sealing protrusion provides an efficient sealing mechanism that interacts with the inner peripheral surface of the second enclosure component to create a liquid-tight seal, wherein the sealing force is independent of a fastening force applied to the second enclosure component in direction along the longitudinal axis towards the first enclosure component. In particular, this is realized as the compression force between the sealing protrusion and the inner peripheral surface is essentially perpendicular to the direction in which the first and second enclosure components are fixed to each other. In particular, the sealing force is independent of the fastening force being applied equally around the perimeter of the opening. Therefore, the seal may be formed without relying on a high number of fastening elements or overly rigid materials and the first and second enclosure components may have higher production tolerances, which can be beneficial in terms of ease of production and assembly of the overall system. It may also facilitate sealing in enclosures with complex geometries.

The system can be further configured such that a linear, particularly translational, displacement of the first and second enclosure components towards each other in an axial direction along the longitudinal axis leads to a linear, particularly translational, displacement of the inner peripheral surface along the outer peripheral surface.

In various examples, the system can be configured in such a way that moving the first and second enclosure components towards each other along the longitudinal axis leads to a corresponding linear displacement of the inner peripheral surface along the outer peripheral surface, in particular along the gasket body without applying direct pressure or force towards the gasket body. This means that the second enclosure component, which has the inner peripheral surface, moves or slides along the outer peripheral surface of the first enclosure component.

Thereby, the linear displacement of the inner peripheral surface along the outer peripheral surface, facilitates the forming of the seal along a wide range of positions, as the sealing force, i.e. the force between the sealing protrusion and the inner peripheral surface is independent of movements of the first and second enclosure components in an axial direction, within a predetermined movement range. The movement range may be defined by a range of motion of at least one securing element, in other words fastening element or means, that fixes the two enclosure components to each other.

By bringing the sealing protrusion into contact with the inner peripheral surface of the second enclosure component with the linear movement, the liquid-tight seal between the first and second enclosure components is established with less positional accuracy needed between the first and second enclosure components. No axial force is needed to maintain the sealing force, as the compression force between the gasket and the inner and/or outer peripheral surfaces is in an orthogonal direction, or within an angular range of 5°, or 10°, or 20° from orthogonal, with regard to the axial direction. In other words, the sealing force is in a direction away from the axis, particularly a radial direction, wherein the movement of the first and second enclosure parts are in an axial direction.

The system may further comprise at least one securing element, in other words fastening element, for fastening the first and second enclosure components to each other. The fastening element may be coupled to the first and/or the second enclosure component. The fastening element may exert a fastening force onto the first and or the second enclosure component. The fastening element may move or displace the first and/or the second enclosure component. The fastening movement or fastening displacement or fastening force may be along the longitudinal axis. The securing element may create a force in the axial direction onto the second enclosure component towards the first enclosure component. The direction of this force is such that it pushes or pulls the second enclosure component towards the first enclosure component along the longitudinal axis, which leads to a displacement of the inner and outer peripheral surfaces along each other. This securing element could take many examples, such as a screw, clamp, latch, or any other suitable mechanical fastener. In particular, the fastening force may not create pressure on the gasket body. The fastening force may be in a direction orthogonal, or within a predetermined angular range of <5°, <10°, or <20° from orthogonal, relative to the direction in which the protrusion extends from the gasket body. The fastening force may be in a direction parallel, or within a predetermined angular range of <5°, <10°, or <20° from parallel, relative to the axial direction, and/or relative to the inner and/or outer peripheral surface. Therefore, the fastening force may be independent from a sealing effect or sealing force. In other words, the fastening force does not increase the sealing force or sealing strength. The fastening force does not lead to a movement of the first and second enclosure components relative to each other, that compresses the gasket body and/or sealing protrusion, or reduces pressure onto the sealing protrusion.

It will be understood that any angular features may be viewed and/or realized in a cross-sectional plane, which may be along and including the longitudinal axis, or orthogonal to the longitudinal axis. Any angular features may be realized at least within the regions of the inner and/or outer peripheral surfaces that are in contact, or come into contact, with the gasket.

Thereby the sealing protrusion on the gasket body remains compressed against the inner peripheral surface of the second enclosure component. This force exerted by the securing element helps to maintain the liquid-tight seal by ensuring that the components remain securely in contact along the sealing protrusion, despite external factors like vibrations, temperature changes, or pressure differences.

The at least one sealing protrusion may extend orthogonally, or within an angular range of <5°, <10°, or <20° from orthogonal, with regard to the inner peripheral surface, wherein it extends towards the inner peripheral surface and contacts the inner peripheral surface.

The at least one sealing protrusion on the gasket body may extend orthogonally from the gasket body, or within a certain angular range from orthogonal, relative to the longitudinal axis and/or the outer peripheral surface. This angular range can be less than 5°, 10°, or 20°. In other words, the sealing protrusion could be perpendicular to the gasket body, or it could deviate slightly from the perpendicular, up to an angle within the stated ranges, such that not only perpendicular directions may be included, but also angular variations, ensuring an efficient sealing effect. By extending the sealing protrusion orthogonally or near-orthogonally from the gasket body towards the inner peripheral surface, an effective seal can be created when the sealing protrusion is compressed against the inner peripheral surface that is widely independent of forces or movements in axial direction. This design increases the robustness of the seal and may also enhance the seal's resistance to variations in pressure, temperature, and other environmental factors. It may also allow for more tolerance in the manufacturing process of the enclosure components and the gasket.

The outer peripheral surface and/or the inner peripheral surface may extend at least partly in parallel to the longitudinal axis, or within an angular range of <5°, <10°, or <20° from parallel. The outer and/or inner peripheral surfaces may be at least partially plane surfaces, or may be curved surfaces, particularly free-form surfaces. In other words, the surfaces are essentially aligned with the axis or slightly angled. They are designed such that when the first and second enclosure components are brought closer to each other, the minimum distance between the inner and outer peripheral surfaces is bigger than the thickness of the gasket body in radial direction. The distance between the inner and outer peripheral surfaces may be bigger than 1 mm, or 2 mm, or 5 mm, allowing for higher manufacturing and assembling tolerances.

Therefore, linear displacement of the first and second enclosure relative to each other along the longitudinal axis, may lead to a linear displacement of the outer peripheral surface in parallel to the inner peripheral surface in parallel, or within an angular range of <5°, <10°, or <20° from parallel, relative to each other's orientation, in the region where the gasket contacts the inner and/or outer peripheral surfaces.

Displacement, or linear displacement, may refer to a translation movement along a direction. In the context of two surfaces moving relative to each other, "translation" refers to a type of motion in which all points of one surface move the same distance in the same direction. The surfaces slide or glide over each other without rotation or change in orientation. During a translation movement, all points on a surface (whether flat or curved) move the same distance in the same direction.

For example, imagine two flat plates sliding past each other along a tabletop.

Every point on the top plate moves the same distance, and in the same direction, relative to the corresponding points on the bottom plate. This movement is a translation.

In such a translation motion, the relative orientation and the distance between corresponding points on the two surfaces remain constant. This is in contrast to rotational motion, where points on one surface move in circular paths relative to points on the other surface.

This allows for easier assembly, as well as improved sealing effectiveness. The specified orientation of the peripheral surfaces in relation to the longitudinal axis ensures a smooth and predictable sliding motion when the components are moved towards each other. This can help to prevent misalignments, uneven pressure distribution, and possible leak paths. The stipulated angular deviation ranges might also allow for design flexibility and tolerance in manufacturing.

The sealing protrusion can have a protrusion length, defined as linear distance from the gasket body to a remote end of the sealing protrusion, that is larger than the distance between the inner and outer peripheral surfaces. This protrusion length can be measured from the gasket body to the remote end of the sealing protrusion and may be constant or varying along the perimeter. In particular, the at each point around the perimeter, the length of the sealing protrusion may be longer than the respective distance between the inner and outer peripheral sealing surfaces. Thereby, the protrusion length is deliberately designed to be longer than the gap it is meant to seal, wherein the sealing protrusion is deformed when forming contact, i.e. a contact surface or sealing surface with the inner peripheral surface.

This ensures a robust and effective seal, wherein a longer protrusion length allows the sealing protrusion to be significantly compressed when the inner and outer peripheral surfaces are brought together. This compression ensures a tight seal that accommodates potential irregularities or variations in the dimensions of the surfaces it is sealing. In particular, the sealing protrusion may be compressed by a force exerted by the inner peripheral surface that is in direction perpendicular, or within an angular range of 5, 10, or 20 from, a radial axis of the sealing protrusion. The force by the inner peripheral surface may be in a direction along the gasket body, and not towards the gasket body.

The gasket may have a 3-dimensional shape. The gasket, in particular the gasket body, may include a ring-shaped peripheral center line, which forms a closed path around the longitudinal axis and has a 3-dimensional shape. In particular, it may vary in axial direction. In various examples, the variation of the center line along peripheral direction may comprise a variation that is bigger, or >2 times or >3 times, than the gaskets dimension in axial direction in a radial cross-sectional view. In various examples, the peripheral groove in the inner/or outer peripheral surfaces may not be in one plane and have a 3-dimensional shape. In other words, a peripheral center line of the peripheral groove extending around the longitudinal axis may not be in a plane and may be 3-dimensional. In various examples, the variation of the center line in axial direction may be bigger, or >2 times or >3 times, than the grooves dimension in axial direction. A center line of the sealing protrusion, or of each sealing fin, may not be in a plane and may also be 3-dimensional. A 3-dimensional path may refer to the fact that the path of the center line, when moving along the path around the longitudinal axis, may vary in distance to the longitudinal axis around the perimeter and may further vary in its axial position along the axis, in axial direction, when following around the perimeter.

The ring-shaped peripheral center line may be referred to as a theoretical line that traces the middle or center of the gasket body in a peripheral direction around the longitudinal axis. The line is not confined to a single plane, but instead varies along the longitudinal axis, allowing the gasket to conform to complex geometries.

In other terms, the center line of the gasket, or the center line of the sealing surface, is not flat, but rather can have a curved shape in axial direction along the perimeter, enabling the gasket to be used in enclosures with diverse geometrical configurations. It forms a closed path due to the ring-shaped form of the gasket.

This feature allows for greater flexibility and adaptability of the gasket, enhancing its sealing capability by enabling it to form a more accurate and secure seal, even in complex enclosure geometries. It also implies that the gasket can adjust its shape based on the specific contours and profiles of the enclosure components, providing an effective seal against the ingress of external elements. In various embodiments the variation of the center lines in axial direction may comprise variations bigger than the gasket's dimension in axial direction, for example, bigger than 5 mm, 10 mm, or 20 mm, or 30 mm.

The sealing protrusion may comprise or may consist of at least one sealing fin, in other words sealing lip, having a tapered form towards an outward direction, extending radially outward from the gasket body, and extending around the entire perimeter of the outer peripheral surface. The tapered form ensures a wide sealing area with the inner peripheral surface, providing a barrier against liquid ingress that is robust and secure.

The sealing protrusion can comprise at least two sealing fins, wherein the at least two sealing fins are spaced apart from each other in a direction along the longitudinal axis. The at least two sealing fins can have the same length, for example they extend equally from the gasket body, thereby providing increased sealing effectiveness. The presence of multiple sealing fins provides redundancy, in case one fin doesn't provide a complete seal, the other may compensate. The uniform length of the fins ensures that each has an equal opportunity to seal effectively, providing a fail-safe mechanism for the sealing system. The system may comprise three sealing fins with same length. Or the first sealing fin, i.e. the fin closer to the opening of the first enclosure component may have a shorter length than the second sealing fin. The fins may have a convex shaped surface towards the inner peripheral surface, by which the contact or sealing surface is formed.

The at least two sealing fins may have different shapes and/or different fin lengths. A sealing fin may comprise a combination of different materials with varying elasticity.

In other words, while the peripheral surfaces may move along each other, wherein the sealing fins maintain contact and the sealing force may be kept within a predefined range, therefore the direction of the force and/or the magnitude of the force the exerted on the sealing protrusion may substantially remain unaffected. The inner peripheral surface may not press against the sealing protrusion such that the force is directed towards the gasket body, but rather in a direction along the outer peripheral surface and along the gasket body, i.e. parallel or within an angular range. Further, a stopping feature may be implemented in the first or second enclosure components and/or the inner or outer peripheral surfaces, such that the movement between the parts is restricted to a range, wherein the inner peripheral surface does not reach the gasket body and does not exert direct pressure onto the gasket body.

This can ensure the durability and integrity of the sealing protrusion. By preventing direct force on the sealing protrusion towards the gasket body, potential damage or deformation to the sealing protrusion can be reduced. This maintains the performance of the seal and can increase the lifespan of the system.

The outer peripheral surface of the first enclosure component can comprise a groove extending partly or entirely around its perimeter, in other words a peripheral groove. The gasket body may be located within the groove, and in contact with a groove surface, whereby the gasket body is fixed relative to the first enclosure component. This feature ensures a firm placement and alignment of the gasket body relative to the first enclosure component. By placing the gasket body within the groove on the outer peripheral surface, the risk of displacement during assembly or usage is minimized, thereby ensuring a reliable and consistent sealing performance.

A bottom surface of the groove can be a curved surface in axial direction, in particular it can comprise at least parts or combination of parts with a convex, or concave, or freeform shape. This implies that the groove designed to hold the gasket body does not have a flat bottom in axial direction, but instead, it is curved, for example with a convex shape, leading to a more secure fit for the gasket body and more design freedom of the first enclosure component, as the seal does not depend on a force of the second enclosure component directed towards the outer peripheral surface, particularly the gasket body.

The gasket can further comprise a base portion extending from the gasket body and fixed in a corresponding channel formed in the bottom surface of the groove in the outer peripheral surface. This base portion can be fixed in a corresponding channel formed in the bottom surface of the groove in the outer peripheral surface, and it can be secured there with a press fit. Therein, the channel may have a tapered form, extending in diameter with increasing distance from the gasket body, and optionally following a corresponding tapered form of the base portion.

The inclusion of a base portion extending from the gasket body allows for an additional securement. This base portion can be fixed into a channel formed in the curved bottom surface of the groove, further stabilizing the positioning of the gasket within the groove. This press fit assembly can be beneficial in enhancing the overall stability of the gasket within the groove, potentially improving the sealing integrity and performance.

In various examples, there could be a channel in the gasket body instead, or additionally, and a protrusion or protrusion fin defined in the enclosure component, onto which the gasket body is fixed, fitting in this groove of the gasket body. In various examples, around the perimeter of the outer peripheral surface and the groove, at least partly, for example in at least two or three or 5 regions, there could be protrusions in the housing, separated by areas without housing protrusions. This enables additionally to the locking in axial direction, a locking in peripheral direction.

A corresponding sealing system is provided, with a different arrangement of the gasket. Instead of the gasket body contacting the outer peripheral surface of the first enclosure component, it is now in contact with the inner peripheral surface of the second enclosure component. Correspondingly, the sealing protrusion now extends in a direction towards the axis, i.e., inwards or radially inwards from the gasket body along its perimeter, rather than extending outward.

The system for creating a sealed enclosure for electronic equipment comprises a first enclosure component, which has an opening defining an outer peripheral surface, which faces away from a longitudinal axis through the opening; a second enclosure component defining an inner peripheral surface, which is arranged around the outer peripheral surface and faces inwards towards the outer peripheral surface; and a flexible ring-shaped gasket, the gasket comprising a gasket body in contact with the inner peripheral surface of the second enclosure component and a sealing protrusion extending radially inward from the gasket body along its perimeter, in contact with the outer peripheral surface of the first enclosure component. Here, the outer and inner peripheral surfaces extend along the longitudinal axis, and the outer peripheral surface of the first enclosure component is in contact with the sealing protrusion along its perimeter, in order to form a liquid-tight seal between the first and the second enclosure component.

It is to be understood that this system provides an alternative sealing arrangement. This configuration might be beneficial in different assembly or equipment conditions where the inward extension of the sealing protrusion towards and contacting the outer peripheral surface could lead to a better sealing effect or easier assembly process.

Accordingly, in this example, the inner peripheral surface of the second enclosure component can comprise a groove extending around its entire perimeter, and wherein the gasket body is located within the groove, whereby the gasket body is fixed relative to the second enclosure component.

A bottom surface of the groove can be a curved surface in axial direction. The gasket can further comprise a base portion extending from the gasket body and fixed in a corresponding channel formed in the bottom surface of the groove in the inner peripheral surface with a press fit. The base portion can have a tapered form in direction towards the gasket body, which may lead to a press fit in the channel. The channel may have a tapered form, i.e., a tapered opening in a cross-sectional view, whereby the base portion is better fixed within the channel. It will be understood that the concepts described with regard to the embodiments, wherein the gasket body sits on the first enclosure component and the sealing protrusion extends in an outward direction, may also be applied to the embodiments, wherein the gasket body sits on the second enclosure component and the sealing protrusion extends in an inward direction towards the outer peripheral surface, wherein—mutatis mutandis—the terms inner and outer peripheral surface, inner and outer direction, and first and second enclosure component are to be exchanged in order to account for the different placement of the gasket.

Corresponding methods for creating a sealed enclosure are provided for both systems, wherein the gasket body is fixed either on the first enclosure component or the second enclosure component. These methods can be performed, for example, by any sealing system as described in the present disclosure.

A method for forming a liquid-tight seal in an enclosure system for electronic equipment can comprise the steps of: providing a first enclosure component having an opening defining an outer peripheral surface facing away from a longitudinal axis through the opening; providing a flexible ring-shaped gasket, the gasket comprising a gasket body in contact with the outer peripheral surface and a sealing protrusion extending radially outward from the gasket body along its perimeter; providing a second enclosure component, the second enclosure component having an opening defining an inner peripheral surface facing towards the outer peripheral surface; moving the second enclosure component towards the first enclosure component along the longitudinal axis, wherein the inner peripheral surface is displaced along the outer peripheral surface, such that the inner peripheral surface of the second enclosure component comes into contact with the sealing protrusion along its perimeter and the sealing protrusion is compressed to form a liquid-tight seal between the first and second enclosure components.

A method for forming a liquid-tight seal in an enclosure system for electronic equipment can comprise the steps of: providing a first enclosure component having an opening defining an outer peripheral surface facing away from a longitudinal axis through the opening; providing a second enclosure component defining an inner peripheral surface arranged facing towards the outer peripheral surface; providing a flexible ring-shaped gasket, the gasket comprising a gasket body in contact with the inner peripheral surface of the second enclosure component and a sealing protrusion extending radially inward from the gasket body along its perimeter; moving the second enclosure component towards the first enclosure component along the longitudinal axis, wherein the outer peripheral surface of the first enclosure component is displaced along the inner peripheral surface, such that the outer peripheral surface of the first enclosure component comes into contact with the sealing protrusion along its perimeter, wherein the sealing protrusion is compressed to form a liquid-tight seal between the first and second enclosure components.

For such a methods and systems for creating a sealed enclosure for electronic equipment, similar technical effects may be achieved as described throughout the present disclosure.

It is to be understood that the features mentioned above and features yet to be explained below can be used not only in the respective combinations indicated, but also in other combinations or in isolation, without departing from the scope of the present disclosure. In particular, the features mentioned above and those yet to be explained below may be used not only in the respective combinations indicated, but also in other combinations or in isolation without departing from the scope of the disclosure.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

These and other objects of the invention will be appreciated and understood by those skilled in the art from the detailed description of the preferred embodiments and the following drawings in which like reference numerals refer to like elements.

DETAILED DESCRIPTION OF EXAMPLES

Figure 1:
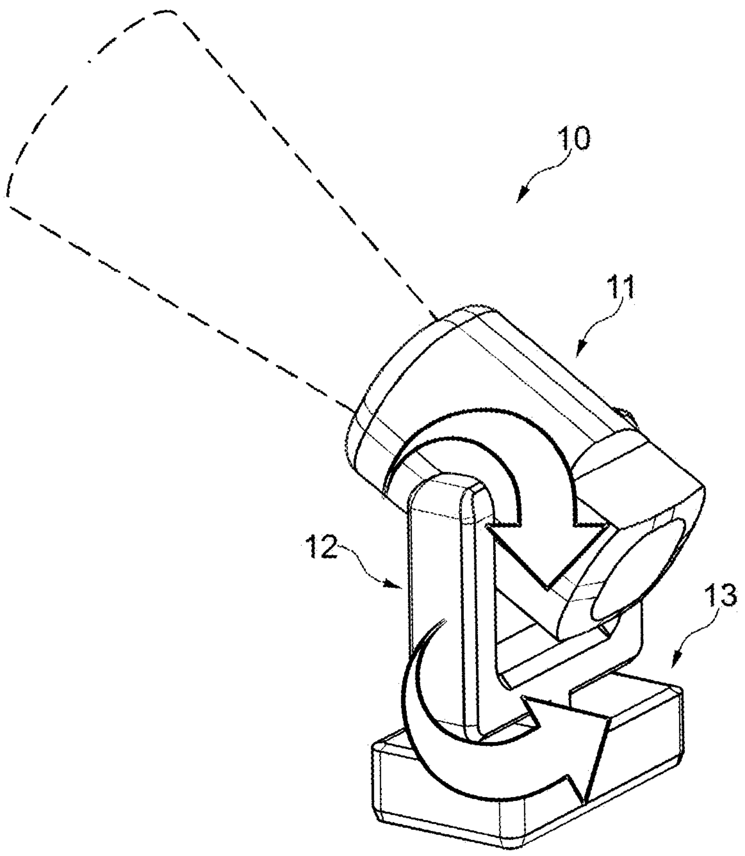
FIG. 1 schematically illustrates an overview of a moving head light fixture, according to various embodiments.

In the following, embodiments of the invention will be described in detail with reference to the accompanying drawings. It should be understood that the following description of embodiments is not to be taken in a limiting sense. The scope of the invention is not intended to be limited by the embodiments described hereinafter or by the drawings, which are taken to be illustrative examples of the general inventive concept. The features of the various embodiments may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be described that relate to sealing techniques for enclosures or housings of electronic equipment, in particular enclosures or housings of a light fixture.

FIG. 1 schematically illustrates an overview of a moving head light fixture 10, according to various embodiments.

The moving head light fixture 10 comprises a head 11, a yoke 12, and a base 13. The head 11 houses various electronic and optical equipment, such as light sources, light shaping components, lenses, sensors, control electronics, and possibly cooling equipment. These components require protection from environmental influences such as moisture, dust, or external mechanical impacts, making it essential for the head 11 to form a sealed inner space in which the components are housed. The sealing of this space is established by an enclosure system as described in the present disclosure. A gasket forms a liquid-tight seal, providing robust protection for the sensitive electronics inside the head 11. The yoke 12 provides a connection between the head 11 and the base 13, enabling the head 11 to rotate and move in different directions.

Figure 2:
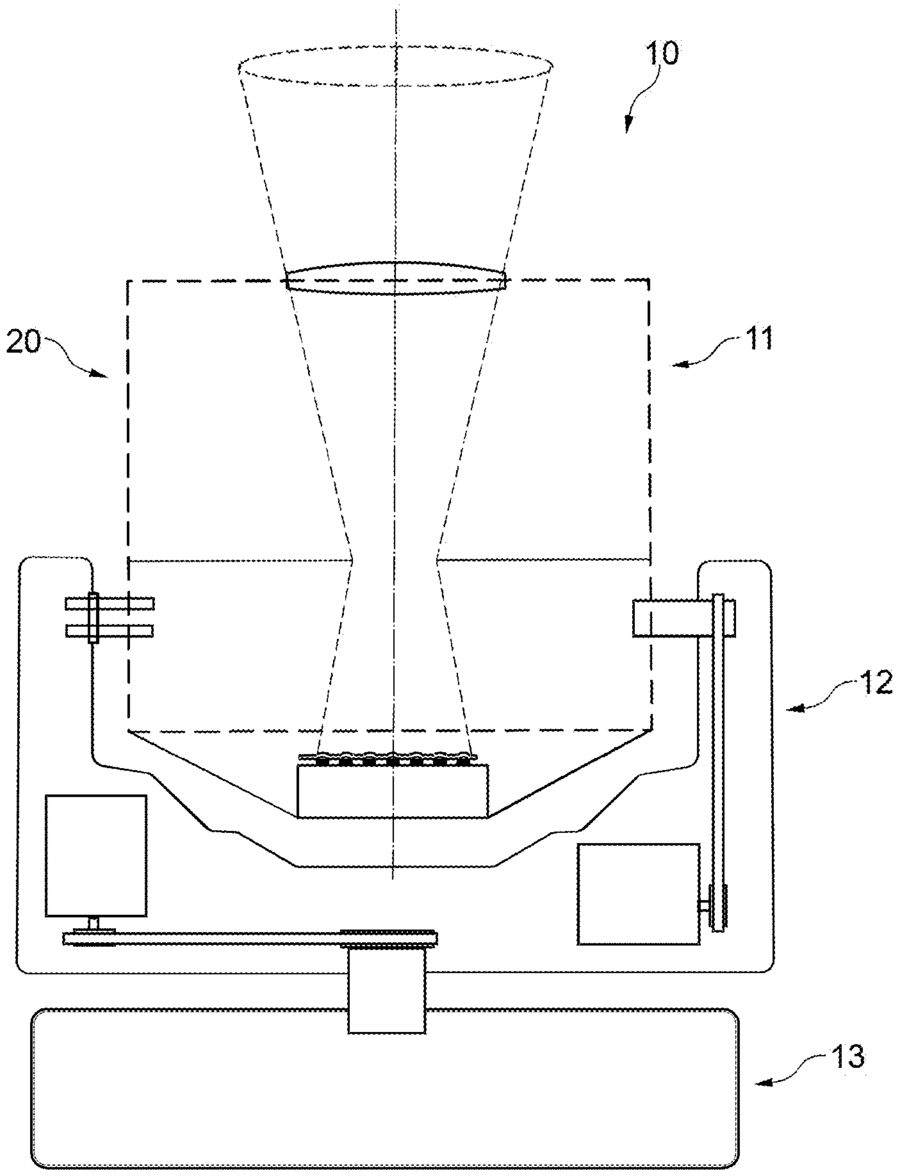
FIG. 2 schematically illustrates a position of a liquid-tight seal in the enclosure of the head of the moving head light fixture of FIG. 1, according to various embodiments.

FIG. 2 schematically illustrates a position of a liquid-tight seal 20 in the enclosure of the head 11 of the moving head light fixture 10 of FIG. 1, according to various embodiments.

The liquid-tight seal 20 is depicted as dotted lines extending around the entire perimeter of the head 11, ensuring the creation of a closed, protected environment for the internal components. Inside the head 11, light sources and optical components such as lenses and reflectors are arranged, which are essential for the function of the moving head light fixture 10 and need to be kept secure from environmental impacts. The yoke 12, connecting the head 11 to the base 13, houses actuators that facilitate the rotation and movement of the head 11. The seal 20, by creating a liquid-tight barrier, not only protects these intricate internal components but also ensures the smooth and uninterrupted operation of the moving head light fixture 10.

The liquid-tight seal 20 is formed between two enclosure components of the head 11, as will be described in detail with regard to the following figures. These enclosure components are a frame part and a cover part, designed in a way that they define complementary outer and inner peripheral surfaces, which are facing towards each other and extend along a longitudinal axis through the peripheral surfaces.

The system is arranged such that a linear displacement of the enclosure components towards each other in an axial direction along the longitudinal axis leads to a linear displacement of the inner peripheral surface along the outer peripheral surface in axial direction, wherein the gasket between the surfaces is not further compressed.

This design allows for the creation of a reliable and robust liquid-tight seal, which is crucial for the protection of the sensitive electronic components housed within the head 11 of the moving head light fixture 10, while being independent of a force of the enclosure components towards each other.

Figure 3:
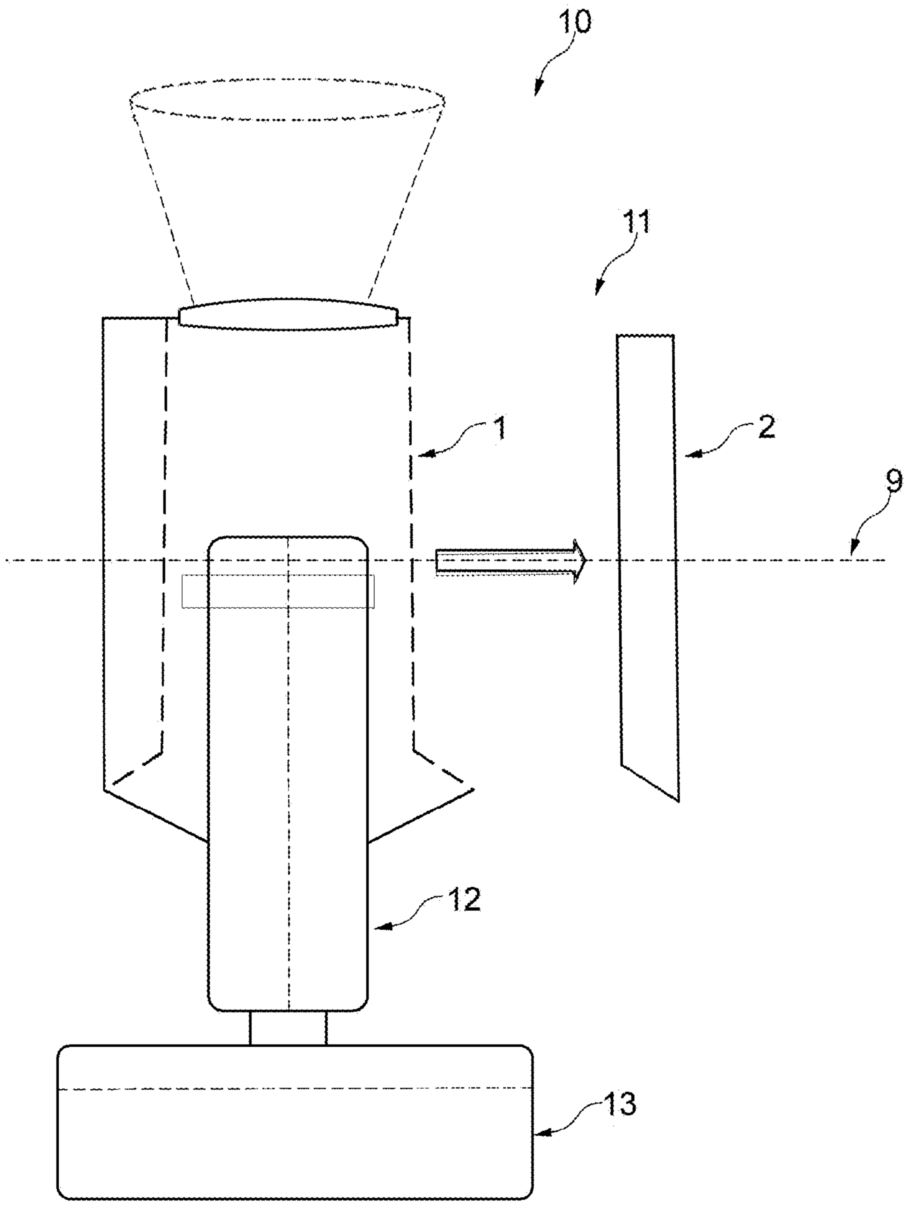
FIG. 3 schematically illustrates a side view of the moving head light fixture of FIG. 2 with further optional positions of liquid-tight seals within enclosures of head, yoke and base of the moving head light fixture, according to various embodiments.

FIG. 3 schematically illustrates a side view of the moving head light fixture 10, as shown in FIG. 2, which further shows optional positions and designs for liquid-tight seals within the enclosures of the head 11, yoke 12, and base 13 of the moving head light fixture 10, as depicted in FIG. 1.

As can be seen in FIG. 3, an arrow depicts the direction in which the first enclosure component 1 and second enclosure component 2 can be separated from each other and then reassembled along axis 9. This axial movement, along with the arrangement of the components, creates the liquid-tight seal in the head 11 of the moving head light fixture 10, as it facilitates the proper alignment and contact of the sealing protrusion on the gasket body with the inner peripheral surface of the second enclosure component, which will be explained in more detail with regard to the following figures.

The figure also indicates, with dotted lines, additional potential placements for the disclosed liquid-tight seals within the yoke 12 and the base 13 of the moving head light fixture 10. These additional placements show how the techniques can be applied to various parts of the moving head light fixture 10 to create multiple sealed enclosures for protecting different sets of electronic components. The seals not only prevent moisture ingress into the sensitive electronic components within the head 11, but they can also offer similar protection to the components housed in the yoke 12 and base 13, further enhancing the overall durability and reliability of the moving head light fixture 10.

As can be seen in FIG. 3, the sealing lines of the head enclosure are not in one line. In other words, the sealing surface, which may be referred to as the surface between the sealing protrusion and inner peripheral surface, may have a center line that varies along the axial position. In general, the gasket may have a shape that is ring-shaped around the longitudinal axis and may have a centerline around the longitudinal axis that varies along the axis.

Figure 4:
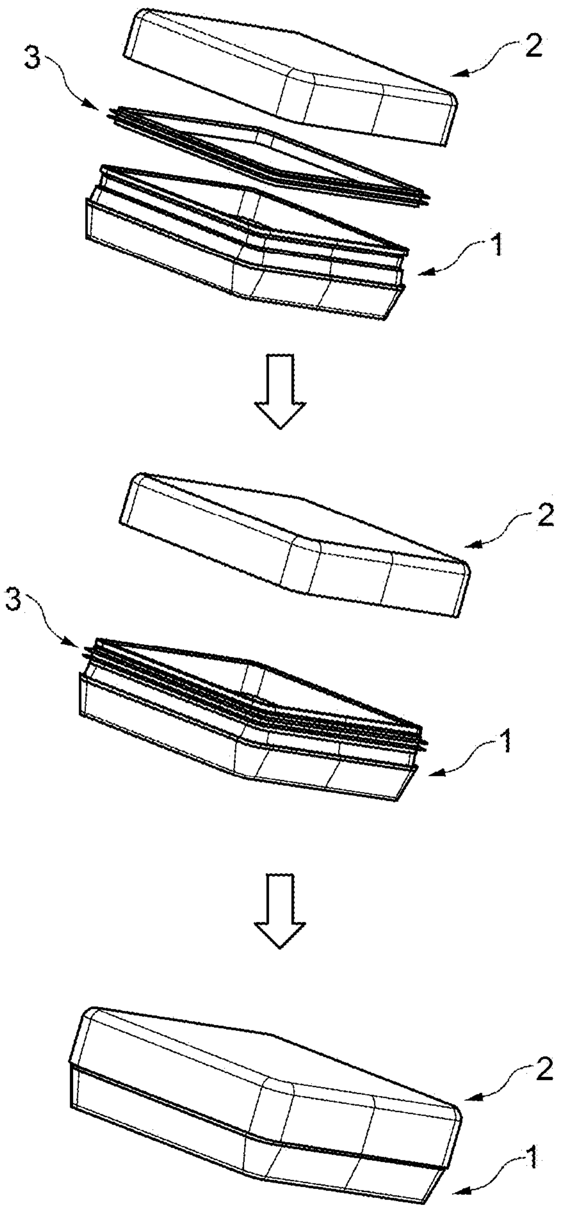
FIG. 4 schematically illustrates steps for creating a sealed enclosure for the moving head light fixture of FIGS. 1-3, according to various embodiments.

FIG. 4 schematically illustrates steps for creating a sealed enclosure for the moving head light fixture 10 of FIGS. 1-3, according to various embodiments.

As indicated by the arrows in FIG. 4, it schematically illustrates the sequential phases for creating a sealed enclosure for electronic equipment according to various embodiments.

In a first phase, three components are provided. These components include a first enclosure component 1, such as a frame part, a second enclosure component 2, such as a cover part, and a flexible ring-shaped sealing gasket 3. The first enclosure component 1 has an opening that defines an outer peripheral surface. This surface is oriented such that it faces away from a longitudinal axis through the opening and comprises a ring-shaped groove. The groove has a curved surface in axial direction.

In a second phase, the sealing gasket 3 is positioned onto the outer peripheral surface of the first enclosure component 1. It is placed within a groove such that the gasket body sits and is fixed within the groove. This configuration ensures that the gasket body remains in a fixed position relative to the first enclosure component.

In a third phase, the second enclosure component 2 is moved towards the first enclosure component 1. This movement occurs along the longitudinal axis, bringing both enclosure components into contact with the sealing gasket 3. This forms a liquid-tight seal between the first and second enclosure components. The seal is achieved when the inner peripheral surface of the second enclosure component comes into contact with a sealing protrusion of the gasket along its perimeter. The sealing protrusion extends radially outward from the gasket body. Therefore, the seal is formed when the inner peripheral surface moves along the gasket body without touching and approaching or pressuring the gasket body. The seal is formed by contact with the sealing protrusions only, and can be maintained within a predefined range of axial movement, without the need for additional axial force or torque for creating or maintaining the seal, and therefore it is not dependent on the application of a large number of fasteners.

Figure 5:
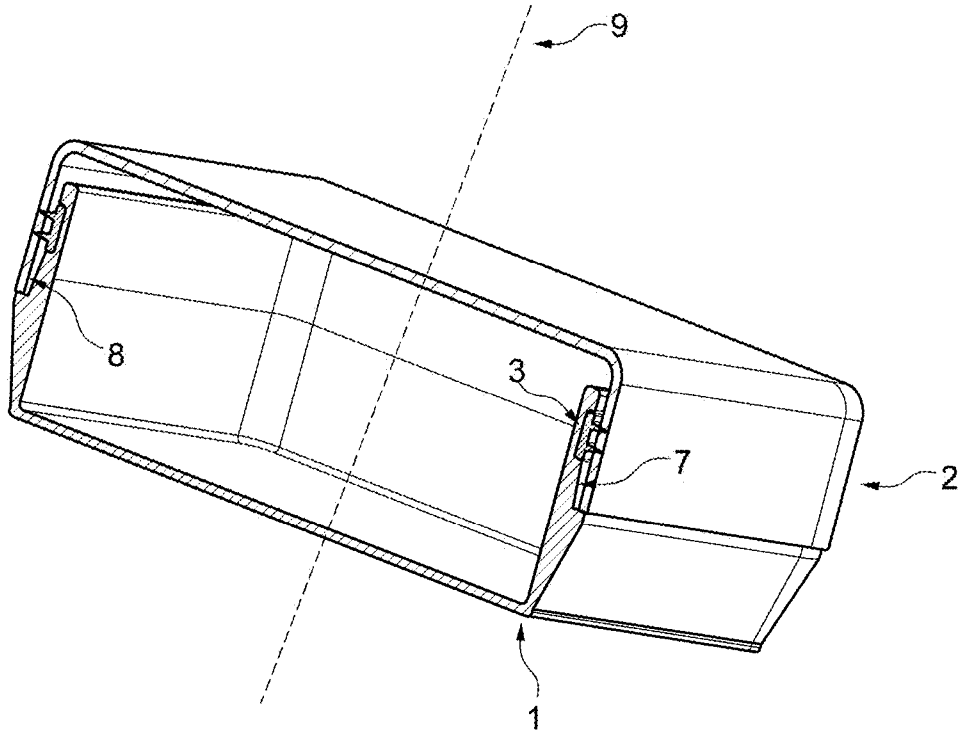
FIG. 5 schematically illustrates a cross-sectional view of the sealed enclosure for electronic equipment of FIG. 4, according to various embodiments.

FIG. 5 schematically illustrates a cross-sectional view of the sealed enclosure for electronic equipment of FIG. 4, according to various embodiments.

The sealed inner space is made up of the first enclosure component 1 and a second enclosure component 2. An opening of the first enclosure component 1 defines an outer peripheral surface 7 that faces outwards relative to a longitudinal axis 9 through the opening. Conversely, the opening of the second enclosure component 2 defines an inner peripheral surface 8 that faces inwards towards the axis 9 and the outer peripheral surface 7 of the first component.

Situated between these two enclosure components is a flexible ring-shaped gasket 3. As will be described in detail with regard to FIG. 6, this gasket consists of a gasket body and a sealing protrusion. The gasket body is in contact with the outer peripheral surface of the first enclosure component 1. The sealing protrusion extends radially outward from the gasket body along its entire perimeter.

The flexible ring-shaped gasket 3 is fixed within a groove extending around the entire perimeter of the outer peripheral surface of the first enclosure component 1. This ensures that the gasket body remains securely fixed relative to the first enclosure component.

When the second enclosure component 2 is moved towards the first enclosure component 1 along the longitudinal axis, the inner and outer peripheral surfaces are moved along each other, without touching each other, wherein the inner peripheral surface 8 of the second enclosure component comes into contact with a sealing protrusion of the gasket. This contact forms a liquid-tight seal between the first and the second enclosure components, as the sealing protrusion is deformed between the two components. However, the inner peripheral surface does not touch or apply pressure to the gasket body.

Particularly, the outer peripheral surface 7 of the first enclosure component 1 and the inner peripheral surface 8 of the second enclosure component 2 extend along the longitudinal axis, at least partially in parallel or within an angular range of less than 5°, 10°, or 20° from parallel with regard to the axis.

Figure 6:
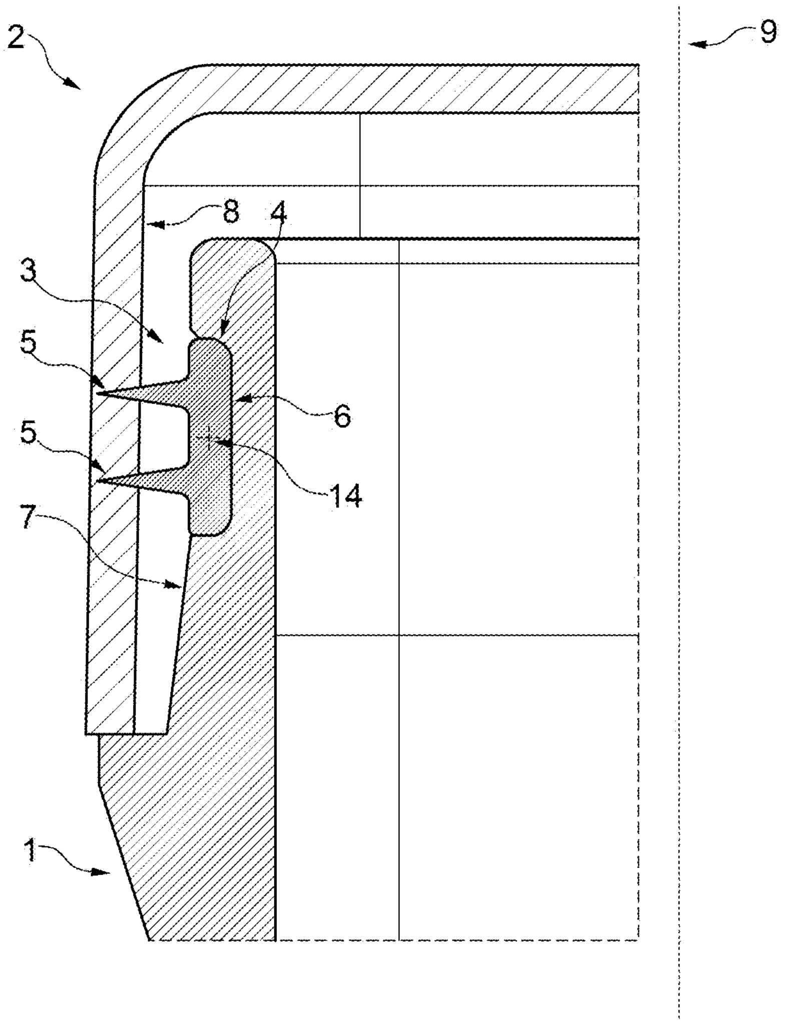
FIG. 6 schematically illustrates a detailed view of the gasket of FIGS. 4 and 5, according to various embodiments.

FIG. 6 schematically illustrates a detailed view of the gasket of FIGS. 4 and 5, according to various embodiments.

As can be seen in FIG. 6, the gasket 3 interacts with the first and second enclosure components 1,2 within the sealed enclosure system for electronic equipment.

The first enclosure component 1 defines an outer peripheral surface 7, which faces outwards from the longitudinal axis 9. A groove 6 extends around the entire perimeter of this outer peripheral surface 7. The groove 6 aids in securing the gasket 3 to the first enclosure component 1.

The gasket 3 includes a gasket body 4 and a sealing protrusion 5. Within the gasket body the center 14, which is part of the ring-shaped center line, of the gasket, in particular gasket body, is depicted as cross in the cross-sectional view. The gasket body 4 is placed within the groove 6, effectively securing the gasket 3 relative to the first enclosure component 1. The sealing protrusion 5 extends radially outward from the gasket body 4 along its perimeter.

The second enclosure component 2 is characterized by an inner peripheral surface 8, which is arranged around the outer peripheral surface 7 and faces inward towards it. When the second enclosure component 2 is moved towards the first enclosure component 1 along the longitudinal axis, the inner peripheral surface 8 comes into contact with the sealing protrusion 5. When the second enclosure component 2 is moved towards the first enclosure component 1 along the longitudinal axis, the inner peripheral surface 8 does not come into contact with the gasket body and/or the outer peripheral surface 7. This forms a liquid-tight seal between the first enclosure component 1 and the second enclosure component 2 by means of the sealing protrusion 5. The distance between the inner and outer peripheral surfaces is bigger than the dimension of the gasket body in outward, i.e. radial, direction.

The protrusion length of the sealing protrusion 5, defined from the gasket body 4 to the remote end of the sealing protrusion, is larger than the distance between the inner and outer peripheral surfaces 8 and 7. This ensures sufficient compression of the protrusion 5 to create an effective seal, while also reducing the likelihood of force exerted onto the sealing protrusion 5 in the direction of the gasket body 4.

In the example of FIG. 6, the sealing protrusion 5 which extends from the gasket body includes two sealing fins. These fins extend radially outward from the gasket body and around the entire perimeter of the outer peripheral surface. They serve to enhance the sealing effectiveness of the gasket by providing contact and compression points between the gasket and the enclosure components. The sealing protrusion comprises two sealing fins, which are spaced apart from each other along the longitudinal axis. The at least two sealing fins are designed to have the same length, providing uniform sealing contact and compression around the perimeter of the enclosure. This arrangement helps ensure a reliable, robust seal across a wide range of operating conditions.

In this example, the sealing protrusion 5 extends orthogonally with respect to the inner peripheral surface 8. However, it could also extend within an angular range of less than 5°, 10°, or 20° from orthogonal with respect to the inner peripheral surface 8. The outer peripheral surface 7 and/or the inner peripheral surface 8 extend in parallel to the longitudinal axis or within an angular range of less than 5°, 10°, or 20° from parallel, they can also have a free-form shape, as long as it is ensured that the distance between the inner and outer peripheral surfaces along the perimeter is smaller than the length of the sealing fins.

Particularly, the sealing protrusion from the gasket body extends outward in a direction that is either orthogonal or within an angular range of less than 5°, 10°, or 20° from orthogonal regard to the surface of the gasket body from which they extend. This alignment optimizes the effectiveness of the seal.

Figure 7:
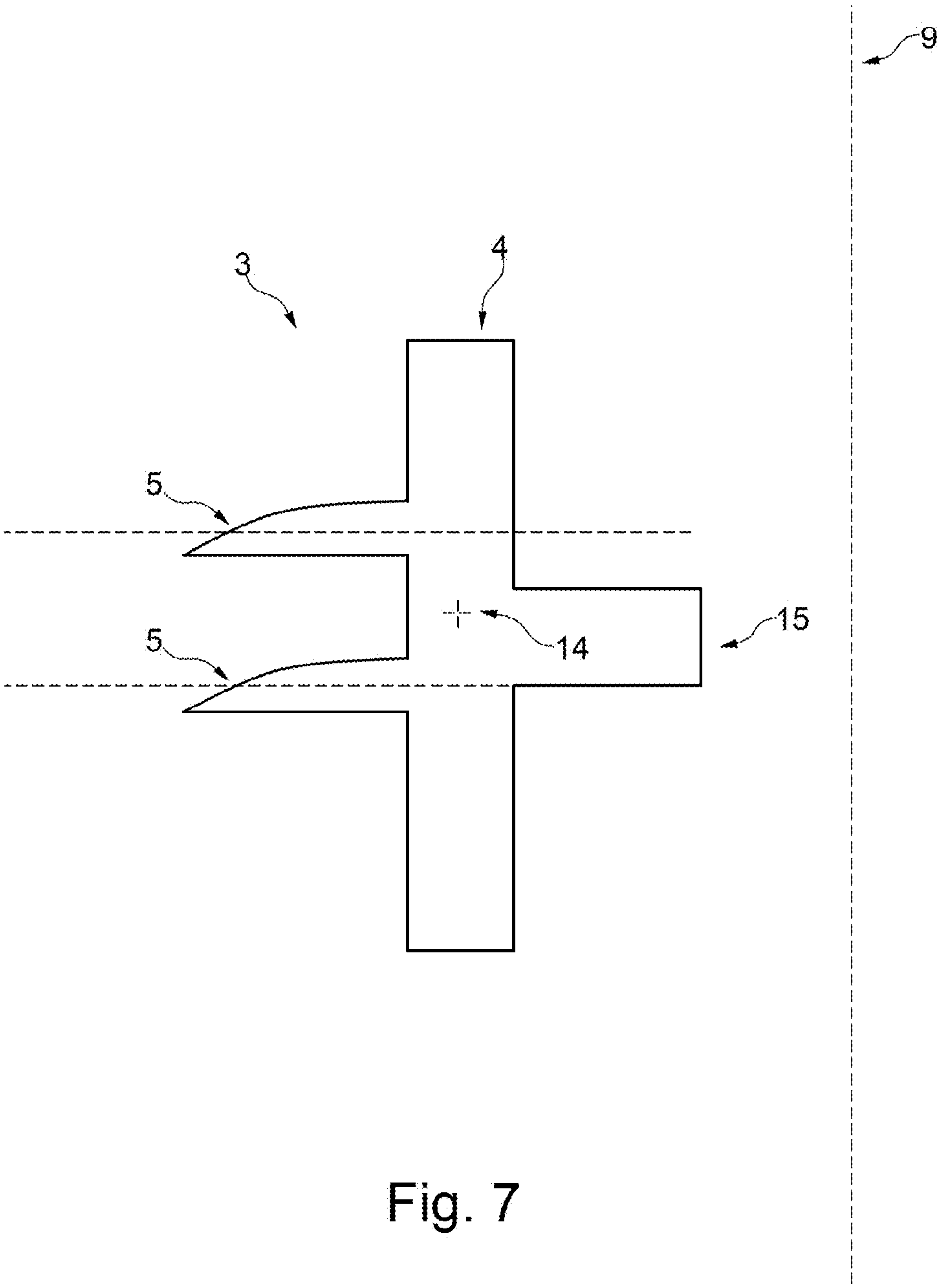
FIG. 7 schematically illustrates a cross-sectional view of a sealing gasket with base portion, according to various embodiments.

FIG. 7 schematically illustrates a shape of sealing gasket 3 in a radial cross-sectional view, according to various embodiments.

The gasket 3, comprises a gasket body 4, within the gasket body the center 14 of the gasket is depicted as cross. The cross 14 depicts where the center line is located within the gasket body, here the center line is in a direction into and out of the cross-sectional view, i.e. perpendicular to the image plane.

The fins of the sealing protrusion 5 each have an axis extending from the gasket body away and perpendicular, or within an angular range from perpendicular, with respect to the longitudinal axis 9 and/or the inner or outer peripheral surfaces at an area to which the sealing surfaces make sealing contact.

The fins have a tapered shape in the direction facing away from the gasket body, narrowing towards the tip, with a convex surface facing in direction of the opening of the first enclosure and facing towards the inner peripheral surface. The backside of the fins is plane.

The shape of the fins can be varied in different sections with respect to the fin axis. The upper half, which is the section closer to the opening of the first enclosure part, can be convex in shape, which may provide a defined sealing force and surface.

Similarly, the lower half of the fins can be plane or concave or convex. Here, a concave shape would curve inward towards the longitudinal axis of the fin, thereby realizing a predefined sealing force when compressed.

The fins could also exhibit a mixed shape, where different sections along the fin's length have different curvatures. This would enable more nuanced control of the sealing pressure distribution along the fin's length.

In addition, the fins could also have a free form or customized shape, where the curvature is not strictly concave or convex but is designed to meet specific sealing requirements.

This variety of possible shapes allows for the design of the sealing system to be tailored to specific use cases, ensuring optimal sealing performance under the specific conditions of use.

Further, sealing gasket 3 includes a base portion 15. The base portion extends in the direction opposite to the sealing protrusion 5 from the gasket body 4.

The base portion 15 is specially designed to provide a press fit within a corresponding channel formed in the bottom surface of the groove 6 in the outer peripheral surface 7. The design of the base portion 15 and the corresponding channel is such that when the gasket 3 is installed into the groove 6, the base portion 15 engages with the channel to create a press fit. This securely locks the gasket in place, helping to maintain the proper positioning and orientation of the gasket within the groove and ensuring a tight and effective seal between the inner peripheral surface 8 of the second enclosure component 2 and the outer peripheral surface 7 of the first enclosure component 1.

Figure 8:
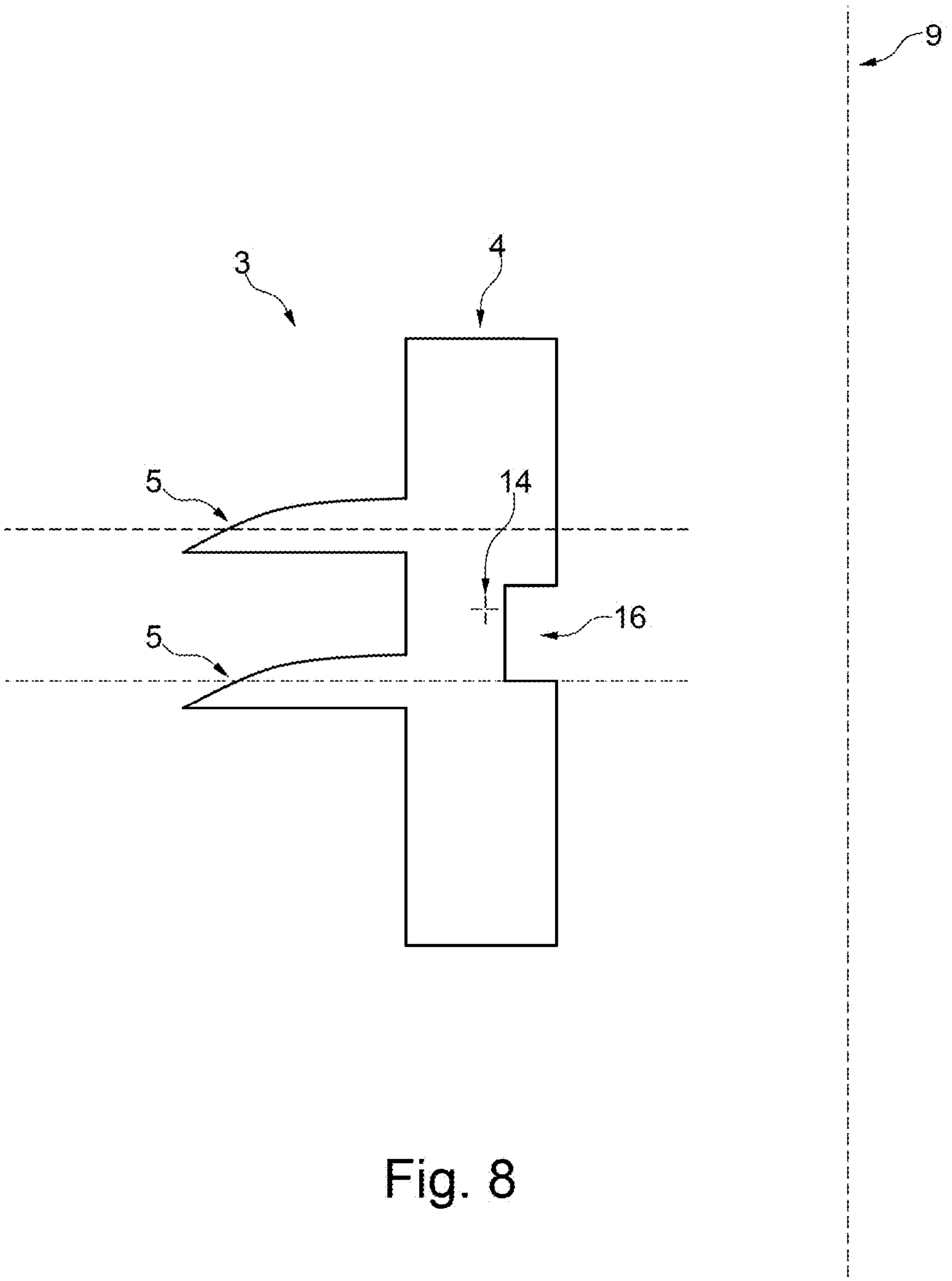
FIG. 8 schematically illustrates a cross-sectional view of a sealing gasket with groove portion, according to various embodiments.

FIG. 8 schematically illustrates a cross-sectional view of a sealing gasket 3 with groove portion 16, according to various embodiments.

The gasket 3 shown in FIG. 8 corresponds to the gasket in FIG. 7, however instead of a base portion 15, the gasket 3 comprises a groove portion 16. When fixed onto the first or second enclosure component, corresponding protrusions defined in the inner or outer peripheral surfaces, for example within the peripheral groove of the enclosure components, may engage the groove portion, such that the gasket is fixed in axial and peripheral direction onto the enclosure component. The cross 14 depicts the location of the center line of the gasket.

The base portion 15 and/or the groove portion 16 can extend around the entire perimeter, or at least partly around the perimeter of the gasket. For example, a gasket may comprise multiple base portions 15 and/or groove portions 16, each extending along a different peripheral section of the gasket 3. It is possible that the gasket includes both groove portions 16 and base portions 15 in alternating arrangement around the perimeter.

Figure 9:
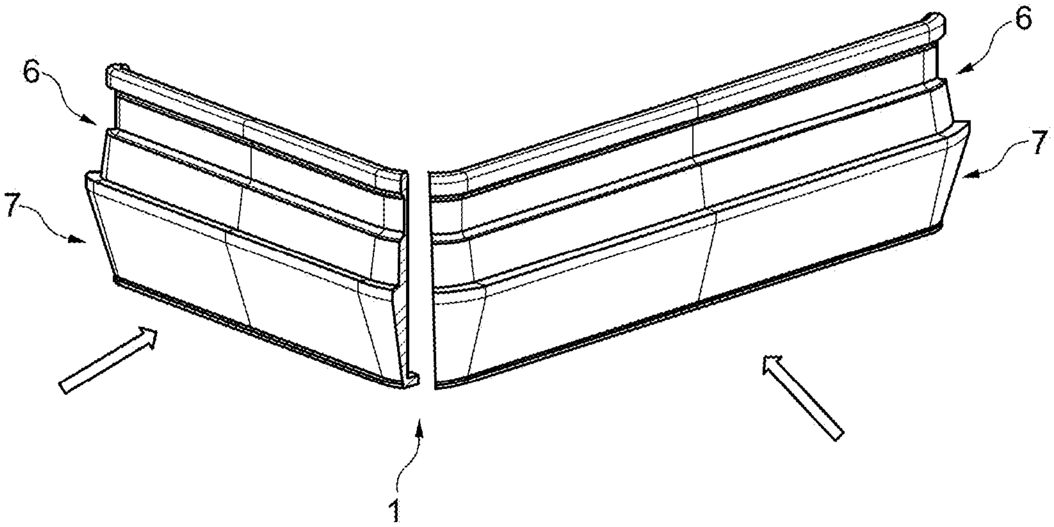
FIG. 9 schematically illustrates an enclosure component comprising two frame parts, onto which a sealing gasket can be fixed, according to various embodiments.

FIG. 9 schematically illustrates an enclosure component comprising two frame parts, onto which a sealing gasket can be fixed, according to various embodiments.

As can be seen in FIG. 9, the first enclosure component consists of at least two frame parts that can be fixed relative to each other using fasteners and the gasket. These frame parts can be assembled and held together by various means, such as screws, clamps, snap-fit connections, or other suitable fastening techniques.

Each of these parts is designed to include a groove 6, around the outer peripheral surface 7. The groove extends at least partially or around the entire perimeter of the outer peripheral surface 7, defining a channel that is designed to receive and hold the gasket 3 securely. The surface of the groove is a curved surface in axial direction, with regard to an axis through the opening.

The gasket 3, with its gasket body 4 and sealing protrusion 5, can be installed into these grooves. Depending on the specific design requirements, the gasket could be either fixed mechanically (e.g., by a press fit or snap-fit) or could be secured using adhesive. Once installed, the gasket provides a seal between the parts of the enclosure component when they are assembled together, thereby protecting the interior of the enclosure from external elements. Using the adhesive or press-fit, the outer peripheral surface can have also concave regions along its perimeter. This can be particularly useful, when the gasket is fixed on the inner peripheral surface.

Figure 10:
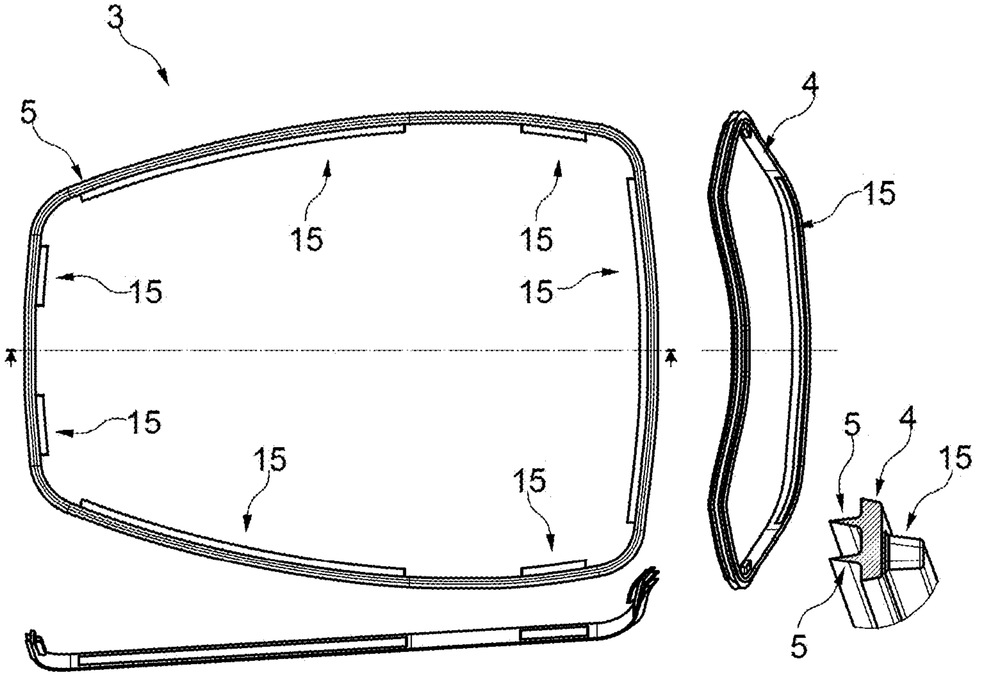
FIG. 10 schematically illustrates a gasket with 3-dimensional shape and with base portions partially extending around the perimeter, according to various embodiments.

FIG. 10 schematically illustrates a gasket 3 with 3-dimensional shape and with base portions 15 partially extending around the perimeter, according to various embodiments.

The ring-shaped gasket, which is oriented around the longitudinal axis, incorporates a gasket body 4 that defines a peripheral closed center line. The center line comprises center points of the gasket, or gasket body, in radial cross-sectional views. For example, the center line may comprise the centers of gravity in radial cross-sections of the gasket body. Each radial cross-section of the gasket, taken perpendicularly to the longitudinal axis, can exhibit a center, or center of gravity, which can collectively define the path of the center line. Thus, the center line is a peripheral, closed path around the longitudinal axis.

In some examples, the center line can reside within a single plane, i.e., be 2-dimensional, as depicted in some previous examples, thereby rendering a two-dimensional configuration to the gasket in a plane orthogonal to the longitudinal axis. In such a layout, the gasket's positioning in the axial direction remains constant.

In the example of FIG. 10, the center line is a three-dimensional closed path, wherein it varies its position in the axial direction within a predetermined range along the longitudinal axis. As a result, the gasket center line has a 3-dimensional shape, allowing to be employed in enclosures with diverse peripheral geometries as its shape can be adjusted along the axial direction. Generally speaking, the gasket may have a 3-dimensional shape, wherein it defines a 3-dimensional sealing path along the inner, respectively the outer peripheral surface.

Further, the base portions 15 of the gasket of FIG. 10 extend partially around the perimeter of the gasket, wherein they are separated from each other by regions of the gasket body without base portions 15. Accordingly, the channels defined in the peripheral surface, on which the gasket body sits, may extend partially around the perimeter, and also separated by regions without channel. The base portions 15 and channels may have a slightly tapered shape, to facilitate assembly and fit. In other words, the gasket may comprise one or more base portions and/or groove portions, each partially, or at least partially, or entirely, extending around the perimeter of the gasket.

Such base portions or grooves may be located on the side where the gasket body is fixed to the first or second enclosure components, the outer or inner peripheral surfaces, or within a peripheral groove of the outer or inner peripheral surfaces. However, it would be possible that the gasket further comprises similar grooves or protrusions on the side of the sealing protrusion, thus enabling a better fit between the first and second enclosure components.

Figure 11:
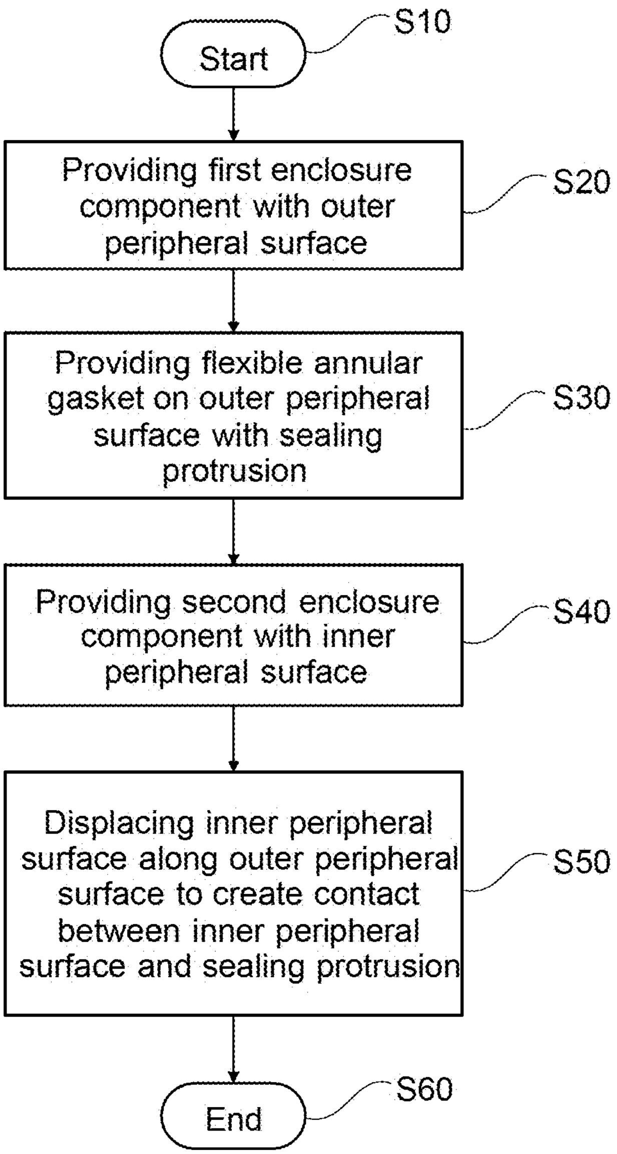
FIG. 11 schematically illustrates steps of a method for creating a sealed enclosure for electronic equipment, according to various embodiments.

FIG. 11 schematically illustrates steps of a method for creating a sealed enclosure for electronic equipment, according to various embodiments.

The method begins with step S10. In step S20, a first enclosure component is provided. This first component has an opening that defines an outer peripheral surface, which is oriented away from a longitudinal axis through the opening.

In step S30, a flexible ring-shaped gasket is provided. This gasket consists of a gasket body, which is in contact with the outer peripheral surface, and a sealing protrusion extending radially outward from the gasket body along its perimeter.

In step S40, a second enclosure component is provided. This second component also features an opening defining an inner peripheral surface, which faces towards the outer peripheral surface of the first enclosure component.

Finally, in step S50, the second enclosure component is moved towards the first enclosure component in axial direction in parallel along the longitudinal axis. During this movement, the inner peripheral surface is displaced along the outer peripheral surface and along the gasket body. This displacement results in the inner peripheral surface of the second enclosure component coming into contact with the sealing protrusion along its perimeter, compressing the sealing protrusion by exerting a force not in the direction towards the gasket body, in order to form a liquid-tight seal between the first and second enclosure components. In particular, the movement of the inner peripheral surface at the contact surface to the sealing protrusion is along the inner peripheral surface, in other words, the sealing protrusion is not further compressed or loosened, but the seal is maintained, when the second enclosure component is moved linearly around the sealing position. The method ends in step S60.

From the above said, various general conclusions can be drawn:

In various examples, the enclosure sealing system may be configured such that a displacement of the first and second enclosure components towards each other does not exert additional force in direction to the gasket, particularly sealing surface, such that the sealing force is not increased. In particular, the sealing force, may be referred to as force between the inner peripheral surface and the sealing protrusion, i.e. the force with which the sealing protrusion is deformed and pressed against the inner peripheral surface, may be independent of and/or not in direction of a fastening force between the first and second enclosure components.

In various examples, the outer peripheral surface may also be referred to as outer sealing surface, and the inner peripheral surface may also be referred to as inner sealing surface. These surfaces may be closed and/or ring-shaped surfaces. They may have a free-form shape and may or may not be symmetrical with regard to the longitudinal axis. They may extend along a section of the axis. A perimeter may correspond to a closed path on a peripheral surface around the axis. The perimeter may be in a plane.

In various examples, the seal can be formed by creating a contact surface between the sealing fin and the inner peripheral around the complete perimeter. The contact surface can have a distance from outer peripheral surface, which does not change, when the second enclosure component is moved in a direction substantially parallel to the longitudinal axis towards the first enclosure component, wherein the outer peripheral surface is moved substantially parallel to the inner peripheral surface.

In various examples, the system can include a first configuration, in which a seal is not formed between the first and second enclosure components, and a second configuration, in which a seal is formed between the first and second enclosure components. The system can be configured to transition from the first configuration to the second configuration by a linear displacement of the first and second enclosure components towards each other along the longitudinal axis, i.e. parallel to the longitudinal axis, whereby the peripheral surfaces are displaced along each other. The displacement may be such that the distance between the inner and outer peripheral surfaces in the region of the gasket may not become smaller than the gasket body, such that no direct pressure is exerted to the gasket body. Then, a further linear displacement of the first and second enclosure components relative to each other along the longitudinal axis around the second configuration may not lead to a decrease or increase in sealing force.

A sealing surface can be defined as the contact surface between the sealing protrusion and the inner peripheral surface of the second enclosure component. In the area of the sealing surface, the sealing protrusion is compressed against the inner or outer peripheral surface. The sealing force can be regarded as the compression force. The sealing force can be perpendicular to the inner or outer peripheral surface. The distance of the sealing surface from the outer peripheral surface remains constant during displacement of the first and second enclosure components relative to each other along the longitudinal axis, thus indicating that the sealing force or compression of the sealing protrusion is not changed. In other words, the fastening means or fastening force does not compress the gasket and does not press the inner and outer peripheral surfaces against each other. In various examples, the distance of the sealing surface from the outer peripheral surface can be changed by an amount that is <10%, <30%, <50% or <90% of the sealing protrusion length, thereby avoiding contact of the gasket body with the second enclosure component and allowing for elastic deformation of the sealing protrusion. The sealing force can be increased by <10%, <30%, <50% or <90% of the minimum sealing force, when the distance of the sealing surface from the peripheral surface is changed, that is when the enclosure components are brought closer together.

Therefore, as the inner peripheral surface delineates the sealing surface, also the sealing surface between the sealing protrusion and the inner peripheral surface extends in axial direction around the longitudinal axis of the first enclosure component. The sealing force is directed in a radial or outward direction relative to the axis. The axial direction corresponds to a direction in which the first and second enclosure components are assembled and held together towards each other by a fastening means. Accordingly, the sealing force from the sealing protrusion towards the inner peripheral surface extends in a direction essentially orthogonal to the force of the fastening means exerted onto the enclosure components.

The seal may provide an ingress protection rating of IPX4 or higher, as defined in standard IEC 60529. The Ingress Protection (IP) rating system classifies the degree of protection against solid objects and water provided by mechanical casings and electrical enclosures. An IPX4 rating signifies that a product is protected against water splashes from any direction. Higher ratings include for example IPX5, IPX6, IPX7, and IPX8 certifying protection during continuous immersion in water. Thus, the disclosed techniques can provide an effective barrier against the ingress of water and other contaminants, protecting the interior of the enclosure and the electronic components housed therein.

Summarizing, a system for creating a housing for electronic equipment is described. The system includes a first enclosure component with an opening that defines an outer peripheral surface facing away from a longitudinal axis. This is combined with a flexible ring-shaped gasket that has a body in contact with the outer peripheral surface, and a sealing protrusion that extends radially from the gasket body along its perimeter. Additionally, the system incorporates a second enclosure component that outlines an inner peripheral surface, positioned around the outer peripheral surface, and directed inwards. The outer and inner peripheral surfaces both align with the longitudinal axis of the system. For creating the seal, the inner peripheral surface of the second enclosure component engages the sealing protrusion along its perimeter. This engagement results in the formation of a liquid-tight seal between the first and second enclosure components, designed to protect the enclosed electronic equipment.

While the systems, components, and methods described herein have been illustrated in the context of a moving head light fixture, it should be understood that the application of the described techniques and configurations is not limited thereto. The principles and innovations are applicable to a variety of electronic equipment enclosures where liquid-tight sealing is needed. These may include, but are not limited to, outdoor electronic systems, marine electronics, aerospace and avionics equipment, data center hardware, laboratory instruments, medical devices, and telecommunications equipment, among others.

The description and figures are merely illustrative and do not limit the scope of the claims to any particular implementation or use. Although the disclosed techniques have been described with respect to certain preferred embodiments, equivalents and modifications will occur to others skilled in the art upon the reading and understanding of the specification. The present disclosure includes all such equivalents and modifications and is limited only by the scope of the appended claims.

The invention claimed is:

1. A system for creating a sealed enclosure for electronic equipment, comprising:

a first enclosure component, which has an opening defining an outer peripheral surface, which faces outwards relative to a longitudinal axis through the opening, the outer peripheral surface of the first enclosure component comprises a ring-shaped peripheral groove extending around the longitudinal axis;

a flexible ring-shaped gasket, the gasket comprising a gasket body in contact with the outer peripheral surface wherein the gasket body is located within the peripheral groove, whereby the gasket body is fixed relative to the first enclosure component, at least one sealing protrusion extending outwards from the gasket body along its perimeter; and a second enclosure component defining a ring-shaped inner peripheral surface, which is arranged around the outer peripheral surface and faces inwards towards the outer peripheral surface;

wherein the outer and inner peripheral surfaces extend along the longitudinal axis, and the inner peripheral surface of the second enclosure component is in contact with the at least one sealing protrusion along its perimeter, to form a liquid-tight seal by compressing the at least one sealing protrusion between the first and the second enclosure component without applying direct force towards the gasket body, the inner peripheral surface of the second enclosure component does not come into contact with the gasket body or the outer peripheral surface of the first enclosure component.

2. The system of claim 1, further configured such that a translational displacement of the first and second enclosure components towards each other in an axial direction leads to a translational displacement of the inner peripheral surface along the outer peripheral surface.

3. The system of claim 1, wherein the at least one sealing protrusion extends orthogonally about the inner peripheral surface.

4. The system of claim 1, wherein the at least one sealing protrusion extends within an angular range of <5°, <10°, or <20° from orthogonal about the inner peripheral surface.

5. The system of claim 1, wherein the outer peripheral surface and the inner peripheral surface extends in parallel to the longitudinal axis, or within an angular range of <5°, <10°, or <20° from parallel to the axis in axial direction.

6. The system of claim 1, wherein the outer peripheral surface or the inner peripheral surface extends in parallel to the longitudinal axis, or within an angular range of <5°, <10°, or <20° from parallel to the axis in axial direction.

7. The system of claim 1, wherein the at least one sealing protrusion has a protrusion length, defined from the gasket body to a remote end of the at least one sealing protrusion, that is bigger than a distance between the ring-shaped inner peripheral surface and the outer peripheral surface.

8. The system of claim 1, wherein the sealing protrusion comprises at least one sealing fin extending radially outward from the gasket body and extending entirely around a perimeter of the outer peripheral surface.

9. The system of claim 8, wherein the at least one sealing protrusion comprises at least two sealing fins, wherein the at least two sealing fins are spaced apart from each other in axial direction, wherein the at least two sealing fins have the same length.

10. The system of claim 1, wherein translational displacement of the first and second enclosure component towards each other along the longitudinal axis does not exert direct force onto the sealing protrusion in direction of the gasket body.

11. The system of claim 1, wherein translational displacement of the first and second enclosure component towards each other along the longitudinal axis exerts a force onto the at least one sealing protrusion that is not directed towards the gasket body or orthogonal to the inner peripheral surface.

12. The system of claim 1, wherein a ring-shaped center line of the peripheral groove has a 3-dimensional form.

13. The system of claim 1, wherein the gasket further comprises a base portion extending from the gasket body and fixed in a corresponding channel formed in the peripheral groove.

14. The system of claim 1, wherein the gasket further comprises a groove portion in the gasket body which is engaged by a corresponding protrusion in the peripheral groove.

15. A system for creating a sealed enclosure for electronic equipment, comprising:

a first enclosure component, which has an opening defining an outer peripheral surface, which faces away from a longitudinal axis through the opening;

a second enclosure component defining an inner peripheral surface, which is arranged around the outer peripheral surface and faces inwards towards the outer peripheral surface, the inner peripheral surface of the second enclosure component comprises a ring-shaped peripheral groove extending around the longitudinal axis; and a flexible ring-shaped gasket, the gasket comprising a gasket body in contact with the inner peripheral surface of the second enclosure component wherein the gasket body is located within the peripheral groove, whereby the gasket body is fixed relative to the first enclosure component, a sealing protrusion extending inwards from the gasket body along its perimeter, in contact with the outer peripheral surface of the first enclosure component;

wherein the outer and inner peripheral surfaces extend along the longitudinal axis, and the outer peripheral surface of the first enclosure component is in contact with the sealing protrusion along its perimeter, to form a liquid-tight seal by compressing the at least one sealing protrusion between the first and the second enclosure component without applying direct pressure on the gasket body, the inner and outer peripheral surfaces do not contact each other and the outer peripheral surface of the first enclosure compartment does not contact the gasket body.

16. A method for forming a liquid-tight seal in an enclosure system for electronic equipment, the method comprising the steps of:

providing a first enclosure component having an opening defining an outer peripheral surface facing away from a longitudinal axis through the opening, the outer peripheral surface of the first enclosure component comprises a ring-shaped peripheral groove extending around the longitudinal axis;

providing a flexible ring-shaped gasket, the gasket comprising a gasket body wherein the gasket body is located within the peripheral groove, is fixed relative to the first enclosure component, and is in contact with the outer peripheral surface, a sealing protrusion extending outwards from the gasket body along its perimeter;

providing a second enclosure component, the second enclosure component having an opening defining an inner peripheral surface facing towards the outer peripheral surface;

moving the second enclosure component towards the first enclosure component along the longitudinal axis, wherein the inner peripheral surface is displaced along the outer peripheral surface, such that the inner peripheral surface of the second enclosure component comes into contact with the sealing protrusion along its perimeter, and the sealing protrusion is compressed to form a liquid-tight seal between the first and second enclosure components, the inner peripheral and outer peripheral surfaces do not contact each other and the inner peripheral surface of the second enclosure component does not contact the gasket body.

17. A method for forming a liquid-tight seal in an enclosure system for electronic equipment, the method comprising the steps of:

providing a first enclosure component having an opening defining an outer peripheral surface facing away from a longitudinal axis through the opening;

providing a second enclosure component defining an inner peripheral surface arranged facing towards the outer peripheral surface, the inner peripheral surface of the second enclosure component comprises a ring-shaped peripheral groove extending around the longitudinal axis;

providing a flexible ring-shaped gasket wherein the gasket body is located within the peripheral groove, whereby the gasket body is fixed relative to the second enclosure component, the gasket comprising a gasket body in contact with the inner peripheral surface of the second enclosure component and a sealing protrusion extending inwards from the gasket body along its perimeter;

moving the second enclosure component towards the first enclosure component along the longitudinal axis, wherein the outer peripheral surface of the first enclosure component is displaced along the inner peripheral surface, such that the outer peripheral surface of the first enclosure component comes into contact with the sealing protrusion along its perimeter, wherein the sealing protrusion is compressed to form a liquid-tight seal between the first and second enclosure components, the outer peripheral surface of the first enclosure compartment does not come into contact with the gasket body or the inner peripheral surface of the second enclosure.

* * * * *